Dec. 22, 1964  A. BRUNNER  3,162,581
FLUID COOLED NUCLEAR REACTOR PLANT
Filed April 5, 1961   4 Sheets-Sheet 1
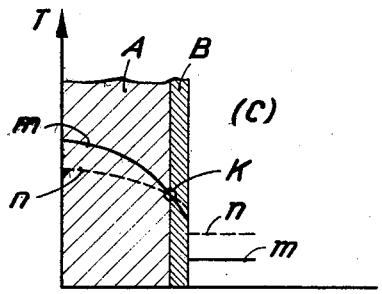
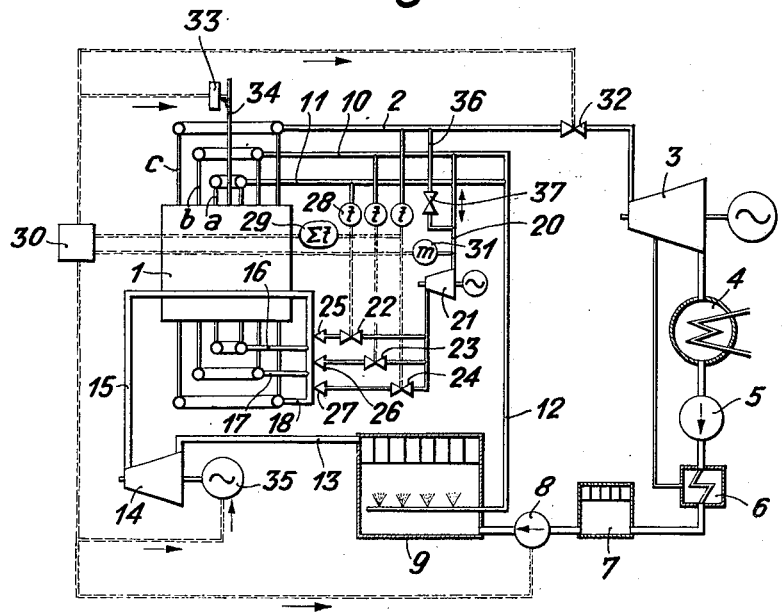
Inventor:
ALFRED BRUNNER
By K.A. ⟨signature⟩
Attorney:

Dec. 22, 1964 A. BRUNNER 3,162,581
FLUID COOLED NUCLEAR REACTOR PLANT
Filed April 5, 1961 4 Sheets-Sheet 3

Inventor:
ALFRED BRUNNER.
By K. A. Mayr
Attorney.

Dec. 22, 1964 A. BRUNNER 3,162,581
FLUID COOLED NUCLEAR REACTOR PLANT
Filed April 5, 1961 4 Sheets-Sheet 4

Inventor:
ALFRED BRUNNER.
By K. A. May.
Attorney:

United States Patent Office 3,162,581
Patented Dec. 22, 1964

3,162,581
FLUID COOLED NUCLEAR REACTOR PLANT
Alfred Brunner, Winterthur, Switzerland, assignor to Sulzer Freres, S.A., Winterthur, Switzerland, a corporation of Switzerland
Filed Apr. 5, 1961, Ser. No. 100,889
Claims priority, application Switzerland Apr. 11, 1960
6 Claims. (Cl. 176—59)

The invention relates to a nuclear reactor plant comprising fuel elements including rods made of fissionable material and disposed in pressure tubes having inlets and outlets for a heat carrier acting as a coolant.

It is known that in nuclear reactors the generation of heat depends upon the neutron flow. The neutron flow is greatest at the center of the reactor, and it is at the center that most heat is generated. The neutron flow, and therefore the generation of heat, decrease towards the periphery of the reactor. In reactors where the fissionable substance is provided in the form, for instance, of rodlike fuel elements, the heat generated by any particular rod, therefore, depends upon the position thereof in the reactor, i.e., the so-called lattice position. This has previously been considered a disadvantage and endeavors have been made to effect a more uniform generation of heat in various parts of the reactor. However, the desired uniformity of heat generation is not obtained by the conventional arrangements. The rate of flow of a coolant fluid into those parts of the reactor where there is less generation of heat has been reduced, for instance by throttling, to ensure that the coolant is heated in the low heat generating parts to the same temperature as in the center of the reactor.

It is an object of the present invention to provide a fluid cooled nuclear reactor plant wherein advantage is taken of the ununiform heat generation inherent in the reactor by providing at least two groups of cooling tubes with fuel rods therein and conducting a relatively hot coolant through the tubes surrounding the fuel rods which generate relatively little heat, and vice versa. The invention makes use of the fact that fuel elements developing less heat permit a greater outlet temperature of the coolant heated thereby than fuel elements generating more heat. The coolant or heat carrier fluid leaving the zone of the reactor where the heat generation is relatively low can, therefore, be much hotter than the heat carrier leaving a zone of the reactor where heat generation is relatively great.

A further object of the invention resides in the provision of heat consuming system which receives heat from a nuclear reactor whose fuel elements are divided into at least two groups which groups are located in different heat producing or temperature zones of the reactor. The heat consuming system receives relatively hot operating fluid which is primarily heated by relatively cool fluid heated by fuel elements in a relatively hot zone of the reactor and which is additionally heated by heat generated by fuel elements in a relatively cool zone of the reactor.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a diagram illustrating the principle on which the invention is based.

FIG. 2 is a diagrammatic illustration of a plant according to the invention.

Figure 3:
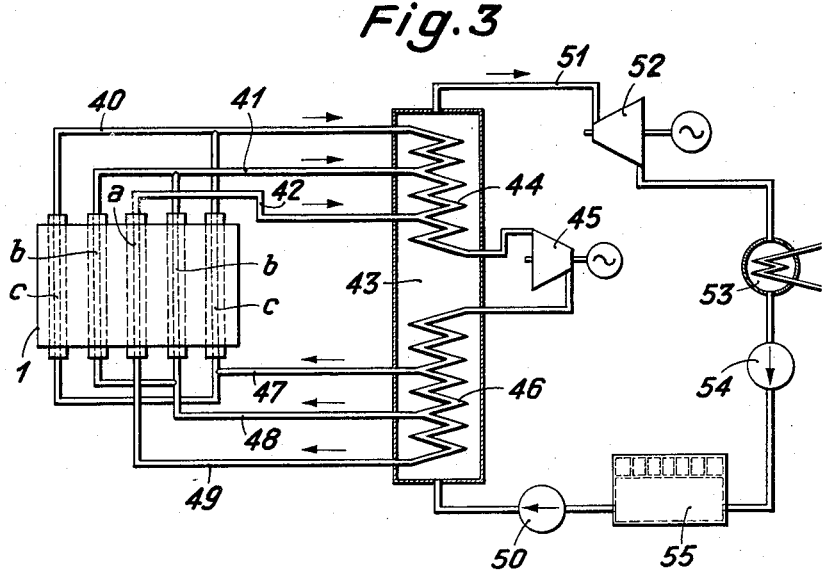
FIG. 3 is a diagrammatic illustration of a modified plant according to the invention.

FIG. 1 is a graph illustrating the temperatures of a fuel rod and its can and of the collant surrounding the fuel rod. The letter A designates one half of the longitudinal section of a fuel rod. The letter B designates the canning of the fuel rod, and the letter C designates the heat carrier or coolant surrounding the fuel rod. A solid line $m$ represents temperature conditions in a fuel element generating relatively much heat, and a dotted line $n$ shows temperature conditions in a fuel element generating relatively little heat. In both elements the temperature is highest at the center of the fuel rod and decreases towards the periphery of the fuel rod because of the cooling action of the heat carrier fluid. The critical temperature is, for instance, the temperature K which can be withstood by the canning material. In order to reduce the neutron capture cross-section the canning is usually made of aluminum or similar metals which are not particularly heat resistant. The graph shows that the temperature K of the canning is the same in the case of fuel rods having a relatively low heat generation as in the case of fuel rods generating relatively much heat although the temperature of the coolant is much higher in the first case. The elements placed near the center of the reactor core and generating more heat require a cooler heat carrier than do elements placed in the outer zones of the reactor and the elements in the outer zones which generate less heat, permit a higher temperature of the coolant and can be used to improve the thermal efficiency of the plant. This applies not only to solid cross-section rod-shaped fuel elements, but also to fuel elements of any other cross-section, for instance, to hollow fuel rods, and also to elements of other than rodlike configuration.

The plant shown in FIG. 2 makes use of the facts described in the paragraph next above. The coolant conducting tubes of the fuel rods of a reactor 1 are combined to form three groups $a$, $b$, $c$, each group being provided with a coolant supply pipe which is common to the coolant tubes of the group. The tubes of group $a$ are associated with fuel rods which are disposed at the center of the reactor, i.e. in a high heat zone, and the tubes of the group $c$ are associated with fuel rods disposed in the outer zone of the reactor, i.e. in the lowest heat zone. The fuel elements and their cooling tubes, per se, do not form part of the present invention and are of conventional design, for example, as shown in Patent No. 2,741,593, and are, therefore, not illustrated. The heat carrier or coolant emerging from the tube group $c$ is superheated vapor and is conducted through a pipe 2 to a turbine 3 exhausting into a condenser 4. The condensate is pumped by a pump 5 through a preheater 6 into a tank 7 and is supplied therefrom by a feed pump 8 to an evaporator 9. The coolant leaving the cooling tubes of the group $a$ and $b$ is also in the form of superheated vapor and flows through pipes 10, 11 into a pipe 12 extending into the evaporator 9 where it evaporates the liquid fluid supplied by the feed pump 8. The vapor produced in the evaporator 9 passes through a pipe 13 to a blower 14 wherefrom it is conducted through a pipe 15 and pipes 16–18 into the tubes forming the groups $a$, $b$, $c$. Some of the superheated vapor is removed from the pipe 10 through a pipe 20 and is supplied by a blower 21 through throttle elements 22–23 to the pipe 15 to form mixing stations 25–27 in cascade-fashion. Temperature sensitive elements 28 are individually connected to the pipes 2, 10, 11, each element feeding a temperature signal to one of the throttle elements 22–24. The temperature signals produced by the elements 28 are also supplied to a totalizer 29 and the totalized signal is supplied to a controller 30. The latter is also adapted to receive a flow rate signal from a flowmeter 31 disposed in the pipe 20. The controller 30 actuates a throttle member 32 in the pipe 2, an actuator 33 for moderator rods 34, a speed control device for a motor 35 driving the blower 14 or a device for controlling the output of the feed pump 8. The pipes 2 and 20 are connected through a pipe 36 containing a throttle member 37.

The effluents of the tubes forming the groups $a$, $b$, $c$ have different temperatures, the effluent of the tubes of group $a$ having the lowest temperature and the effluent of the tubes of group $c$ having the highest temperature. To obtain a good thermal efficiency, only the effluent of the group $c$ is supplied to the turbine 3 to produce mechanical work therein. The effluent of the groups $a$ and $b$ which, although producing much heat, permit only a relatively low temperature, is used to evaporate the liquid fluid in the evaporator 9. Some of the fluid from group $b$, which is hotter than the fluid from group $c$, is mixed for temperature control purposes at the mixing stations 25–27 with the fluid entering the various groups, the rates of fluid supply to the mixing stations being controlled in dependence on the temperatures measured at the outlets of the individual tube groups.

FIG. 3 shows a nuclear power plant in which a heat carrier fluid and a fluid operating a turbine flow in separate circuits. The reactor 1 has fuel elements or assemblies forming groups $a$, $b$, and $c$, each assembly including a coolant conduit. The coolant emerging from these groups is conducted through pipes 42, 41 and 40, respectively, to a heat exchanger 43. The latter comprises a pipe coil 44 to which the pipes 40–42 are consecutively connected in the order of the temperature of the heat carrier fluid conducted by the pipes. The outlet of the pipe coil 44 is connected to a circulating pump 45 wherefrom the heat carrier fluid passes to a pipe coil 46, also forming part of the heat exchanger for supplying heat thereto. Pipes 47, 48, 49 are connected at different points to the coil 46 for receiving heat carrier fluid at different temperatures and conducting the fluids to the fuel elements $c$, $b$ and $a$, the group $c$ receiving the relatively hottest fluid through the pipe 47 and the group $a$ receiving the relatively coolest fluid through the pipe 49. The heat exchanger 43 receives liquid operating fluid from a feed pump 50. The fluid is evaporated and superheated in the heat exchanger and leaves the same through a pipe 51 which is connected to a turbine 52. The latter exhausts into a condenser 53, the condensate being pumped by a pump 54 into a tank 55 wherefrom the condensate flows to the feed pump 50.

The heat carrier fluid and the fluid operating the turbine flow countercurrent in the heat exchanger 43. Coolant from different zones of the reactor is supplied, in accordance with its temperature, to different parts of the pipe coil heat exchange surface of the heat exchanger and is removed therefrom at temperatures suitable for the various reactor zones. The lowest temperature coolant is supplied to the central zone of the reactor wherefrom the heated coolant is supplied to the pipe coil 44 as the lowest temperature heating fluid. The highest temperature heat carrier fluid is supplied to the fuel elements $c$ in the outer zone of the reactor and is returned to the pipe coil 44 as the highest temperature heating fluid.

Figure 4:
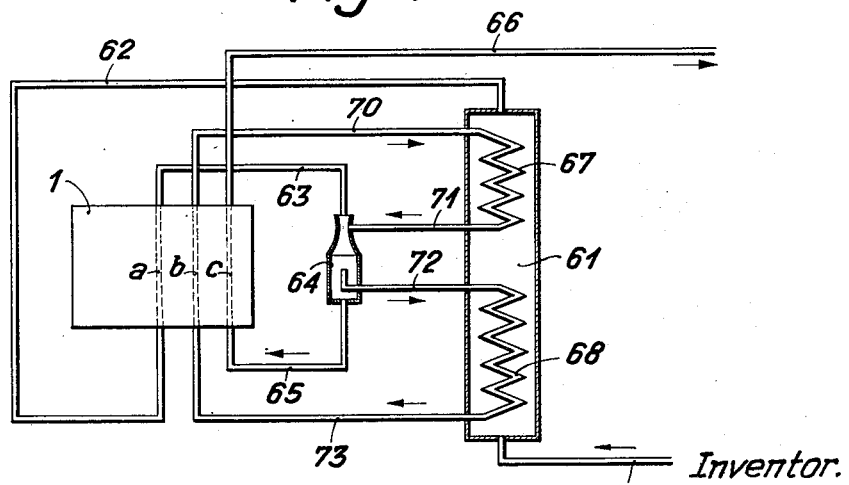
FIG. 4 is a diagrammatic illustration of a further modification of a plant according to the invention.

The arrangement shown in FIG. 4 is similar to the arrangement shown in FIG. 3; the same fluid, however, acts as heat carrier and as operating fluid for a turbine or other heat consumer. The fluid returned by the latter, not shown, flows through a pipe 60 into a heat exchanger 61 and is conducted therefrom through a pipe 62 to the fuel elements forming the group $a$. After cooling these elements the fluid passes through a pipe 63 to an ejector 64 and therefrom through a pipe 65 to fuel elements of the group $c$. Thereupon the fluid flows through a pipe 66 to perform work in a turbine, not shown. The heat exchanger 61 comprises two pipe coils 67, 68, the pipe coil 67 being supplied with coolant of the elements forming the group $b$ through a pipe 70. The effluent of the pipe coil 67 flows through a pipe 71 to the suction zone of the ejector 64. The pipe coil 68 is connected through a pipe 72 to an impact tube in the ejector 64, the fluid flowing from the pipe coil 68 through a pipe 73 to fuel elements forming the group $b$ which is in a medium heat zone of the reactor.

In the arrangement shown in FIG. 4 liquid operating fluid is evaporated in the heat exchanger 61, the vapor being superheated in two consecutive stages in the elements forming the groups $a$ and $c$. The circuit formed by pipe coils 67, 68 and the coolant tubes of the fuel elements of group $b$ supplies heat to the heat exchanger 61.

Figure 5:
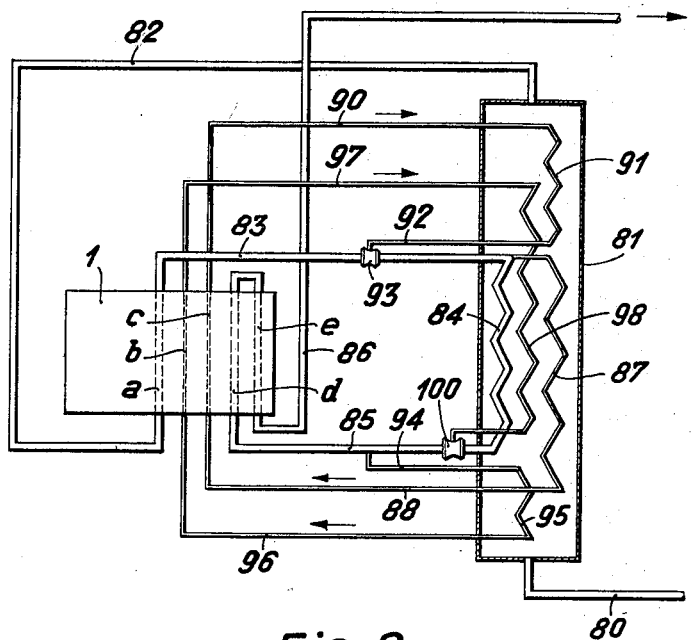
FIG. 5 is a diagrammatic illustration of another modification of a plant according to the invention.

In the embodiment of the invention shown in FIG. 5 the fuel elements in a reactor 1 form five groups $a$, $b$, $c$, $d$ and $e$, group $a$ being in the center and the groups $b$ to $e$ being placed at increasing distance from the center of the reactor. A coolant is conducted through a pipe 80 into a heat exchanger 81 and therefrom through a pipe 82 to the fuel elements of the group $a$. Thereupon the coolant is conducted through a pipe 83 and a pipe coil 84 in the heat exchanger 81 into a pipe 85 wherefrom the coolant flows seriatim through the coolant conduits of the fuel elements of the groups $d$ and $e$ and then through a pipe 86 to a heat consumer, for example, a turbine, not shown. A pipe coil 87 is connected to the pipe 83 to receive fluid therefrom and to conduct the fluid in the heat exchanger 81 in parallel relation to the fluid flowing through the coil 84. The outlet of the coil 87 is connected by a pipe 88 to the coolant conduits of the fuel elements forming the group $c$ which is located in an intermediate heat zone of the reactor. The coolant leaving these elements flows through a pipe 90 to a pipe coil 91 forming part of the heat exchanger 81 and therefrom through a pipe 92 into an ejector 93 interposed in the pipe 83. Fluid is tapped from the pipe 85 and conducted by a pipe 94 to a pipe coil 95 forming part of the heat exchanger 81 and is then conducted through a pipe 96 to the fuel elements of the group $b$ which is closer to the center of the reactor than group $c$. After having cooled the fuel elements of the group $b$ the fluid flows through a pipe 97 and a pipe coil 98 in the heat exchanger 81 to an ejector 100 interposed in the pipe 85.

In the arrangement according to FIG. 5 there is a main coolant stream which flows consecutively through the fuel element groups $a$, $d$ and $e$ which are placed in consecutive zones of the reactor characterized by decreasing heat generation. The coolant becomes hotter as it passes from the zones of relatively great heat generation to the zones of less heat generation. The heat generated in the fuel elements of the groups $b$ and $c$ which are in intermediate heat zones of the reactor, is used, similarly to the system shown in FIG. 4, for supplying heat to the heat exchanger 81.

Figure 6:
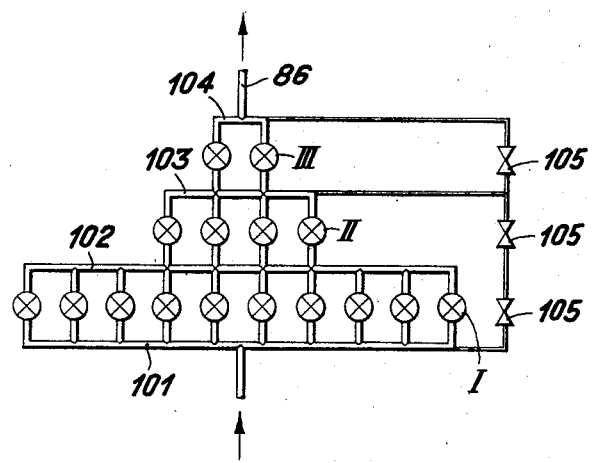
FIG. 6 is a diagrammatic illustration showing the connections of the cooling tubes of fuel elements forming a group of fuel elements.

FIG. 6 shows an arrangement of the coolant conduits of the fuel elements of the group $e$ forming part of the system shown in FIG. 5. The coolant enters group $e$ through a distributing pipe 101 wherefrom the coolant is conducted to fuel elements forming a subgroup I of the group $e$. After passage of the coolant in parallel relation through the elements forming the subgroup I the coolant is collected in a pipe 102 and distributed to fuel elements forming a subgroup II which comprises less elements than the subgroup I. After cooling the elements of the subgroup II the coolant is collected in a header 103 wherefrom the coolant flows in parallel relation through the fuel elements forming a subgroup III. The coolant leaving the fuel elements of the subgroup III is collected in a pipe 104 and flows therefrom into the pipe 86. By-pass pipes are provided for by-passing the subgroups or groups of subgroups of fuel elements. Fluid flow through the by-pass pipes is controlled by valves 105. As the diagram FIG. 6 shows, the number of fuel elements placed in parallel relation with respect to the fluid flow decreases in each consecutive subgroup. The subgroups having the greatest number of fuel elements are placed in a relatively hot zone of the reactor and the subgroups having the smallest number of fuel elements are placed in a relatively cool zone of the reactor. Since the flow areas of the fluid passages of the individual fuel elements are usually the same, the flow velocity of the fluid increases upon a decrease of number of fuel elements which are arranged in parallel relation with respect to the flow of the fluid. Heat transfer from the fuel elements to the fluid is therefore improved.

The arrangement shown in FIG. 6 permits a considerable increase of the temperature of the coolant although a desired temperature, critical temperature K (FIG. 1), is maintained in all fuel elements. The numerical relation between the fuel elements in the various subgroups need not be that shown in FIG. 6. It is important, however, that the flow velocity of the coolant increases as it flows towards the zone where it leaves the reactor.

Figure 7:
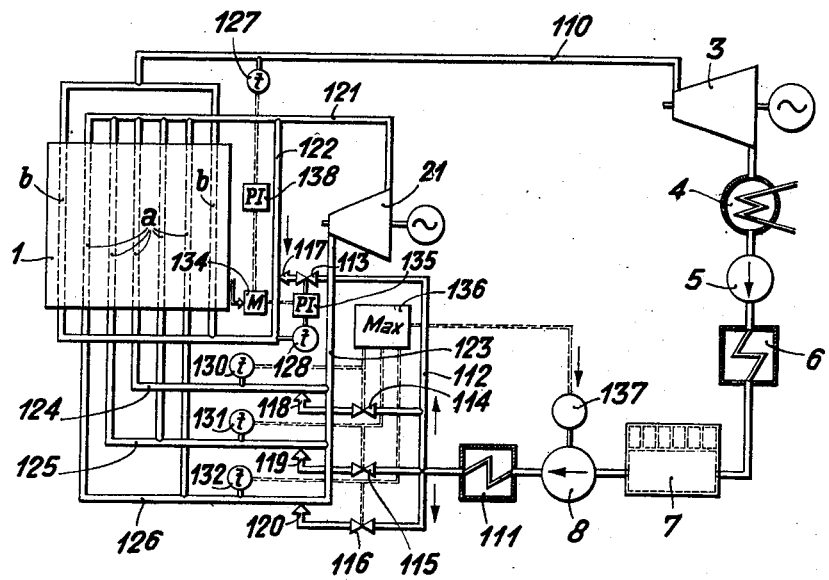
Fig. 7 is a diagrammatic illustration of a further embodiment of the invention.

The embodiment of the invention shown in FIG. 7 is related to that shown in FIG. 2 with the exception that there is no evaporator and there are only two groups $a$ and $b$ of fuel elements. The fluid leaving the group $b$ is conducted through a pipe 110 to a turbine 3 exhausting into a condenser 4. The condensate is pumped by a pump 5 through a preheater 6 into a storage tank 7 and therefrom pumped by a feed pump 8 through a preheater 111 into a distributing pipe 112. Pipes individually provided with valves 113, 114, 115 and 116 are connected to the pipe 112 to receive fluid in liquid state and in parallel relation therefrom.

Coolant which has cooled the fuel elements of the group $a$ is conducted through a pipe 121 to a blower 21. A portion of the coolant flowing in the pipe 121 is diverted into a pipe 122 and distributed therefrom to fuel elements forming the group $b$. The fluid leaving the fuel elements of the group $b$ is conducted through the pipe 110 to the turbine 3. The blower 21 exhausts into a pipe 123 wherefrom the fluid is distributed into pipes 124, 125 and 126 which are connected to conduct fluid in parallel relation into the fuel elements of the group $a$.

The pipe controlled by the aforementioned valve 113 terminates at 117 in the pipe 122 for injecting liquid from the pipe 112 into the vapor in the pipe 122. The pipe containing the aforementioned valve 114 terminates in the form of an injector in the pipe 124 and the pipes containing the aforementioned valves 115 and 116 terminate in injectors 119 and 120 for injecting liquid fluid into the vapor in the pipes 125 and 126, respectively.

The pipe 124 is connected to the fuel elements of the group $a$ which elements are located in the center of the reactor and the pipe 126 is connected to the outermost fuel elements of the group $a$, the pipe 125 being connected to fuel elements of the group $a$ which are between the central elements and the peripheral elements of the group $a$.

The pipe 110 is provided with a temperature sensitive device 127 and the pipes 122 and 124 to 126 are provided with temperature sensitive devices 128 and 130 to 132, respectively. The temperature sensitive device 127 feeds temperature signals into a regulator 138 having a proportional-integral characteristic and producing a set point signal which is fed through a minimal signal transmitter 134 to a proportional-integral regulator 135 which controls the valve 113 and thereby the amount of liquid fed into the injector 117 in response to the temperature sensed by the device 128 whereby the set point of the regulator 135 is determined by the signal furnished by the devices 127, 138 and 134. The temperature sensitive devices 130 to 132 produce signals which are used for actuating the valves 114, 115 and 116, respectively, and which are also fed into a maximum value selector 136. The latter produces a signal corresponding to the highest temperature measured by the devices 130 to 132 which signal is used for actuating a device 137 controlling the output of the feed pump 8.

In the arrangement shown in FIG. 7 coolant which is preheated in the fuel elements forming the group $a$ is additionally heated by heat generated by the fuel elements of the group $b$. Since different fuel elements of the group $a$ generate different amounts of heat per time unit, the elements of the group $a$ are subdivided into three subgroups to which coolant of different temperatures is supplied through the pipes 124, 125 and 126. In this way the temperatures of the coolant leaving the fuel elements of the group $a$ are maintained substantially equal and it is not necessary to differently throttle the coolant entering the fuel elements of the individual subgroups.

I claim:

1. A nuclear reactor plant comprising a nuclear reactor having groups of fuel elements generating relatively little heat, groups of fuel elements generating relatively much heat, each of said fuel elements including conduit means, a coolant fluid of relatively high temperature flowing through the conduit means of fuel elements generating relatively little heat, a coolant fluid of relatively low temperature passing through the conduit means of fuel elements generating relatively much heat, a heat exchanger having a primary side including first conduit means located in a relatively hot zone of the heat exchanger, said primary side including second conduit means located in a relatively cool zone of the heat exchanger, said heat exchanger having a secondary side receiving heat from said primary side, said secondary side forming part of a fluid circuit including a heat consumer and extending through conduit means of said fuel elements, an ejector interposed in said fluid circuit downstream of the fuel elements through which said circuit extends, said ejector being connected to and receiving fluid from said first condut means and being connected to and discharging fluid into said second conduit means.

2. A nuclear reactor plant as defined in claim 1 wherein said ejector is placed at a point of said fluid circuit where the temperature of the fluid in the circuit is substantially equal to the temperature of fluid discharged by said first conduit means.

3. A nuclear reactor plant comprising at least two groups of fuel assemblies generating different amounts of heat per time unit, said fuel assemblies including coolant conduits, a relatively high temperature coolant passing through the coolant conduits of the group of fuel assemblies generating relatively little heat, a relatively cool coolant passing through the coolant conduits of the group of fuel assemblies generating relatively much heat, a heat exchanger having a relatively high temperature zone including a relatively high temperature portion provided with an inlet connected to the coolant conduits of fuel assemblies generating relatively little heat for receiving heated coolant as heating agent therefrom, said high temperature zone including a relatively low temperature portion provided with an inlet connected to the coolant conduits of fuel assemblies generating relatively much heat for receiving heated coolant as heating agent therefrom, said heat exchanger having a relatively low temperature zone including a relatively high temperature portion provided with an outlet connected to the coolant conduits of fuel assemblies generating relatively little heat for returning coolant having served as heating agent in said heat exchanger to the respective fuel assemblies, said relatively low temperature zone including a relatively low temperature portion provided with an outlet connected to the coolant conduits of fuel assemblies generating relatively much heat for returning coolant thereto, and a coolant circulating means interposed in the flow of the coolant between said zones of heat exchanger for circulating the coolant through said heat exchanger and through said coolant conduits of fuel assemblies.

4. A nuclear reactor plant comprising a nuclear reactor having groups of fuel elements generating relatively little heat, groups of fuel elements generating relatively much heat, each of said fuel elements including conduit means, each of said conduit means having an inlet and an outlet, a coolant fluid flowing through each of said conduit means from the inlet to the outlet thereof, the temperature of the coolant fluid passing through the conduit means of the fuel elements generating relatively little heat being higher than that of the coolant fluid passing through the conduit means of fuel elements generating relatively much heat, a heat exchanger, a tubular heating coil in said heat exchanger and having a plurality of consecutive sections, said sections being in successive order connected to the outlets of said conduit means issuing successively colder fluid and being connected to said inlets to supply successively colder fluid to the inlets of said conduit means passing successively colder fluid, and a circulating pump interposed in said heating coil between the sections which are connected to the outlets of said conduit means and the sections connected to the inlets of said conduit means.

5. A nuclear reactor plant comprising a nuclear reactor having different temperature zones, fuel elements including coolant fluid conduits placed in each of said zones, a heat exchanger, a heat consumer, and conduit means forming a circuit and successively passing fluid through said heat consumer, said heat exchanger, coolant fluid conduits of fuel elements in the hottest reactor zone, and coolant fluid conduits of fuel elements in the coolest reactor zone, said heat exchanger including a heating pipe having an inlet connected to said conduit means of said circuit between the conduits of fuel elements in the hottest reactor zone and the conduits of fuel elements in the coolest reactor zone for diverting fluid from said circuit as heating fluid into said heating pipe, said heating pipe having an outlet connected to the conduits of fuel elements in an intermediate temperature zone, said last mentioned conduits being connected to said circuit upstream of the connection of said heating pipe for returning the diverted fluid to said circuit, and an ejector interposed in the conduit means of said circuit between the conduits of fuel elements in the hottest reactor zone and the conduits of fuel elements in the coolest reactor zone and connected for fluid flow to said conduits of fuel elements in an intermediate temperature zone for drawing the diverted fluid into said circuit.

6. A nuclear reactor plant comprising a nuclear reactor having different temperature zones, fuel elements including coolant fluid conduits placed in each of said zones, a heat exchanger, a heat consumer, and conduit means forming a circuit and successively passing fluid through said heat consumer, said heat exchanger, coolant fluid conduits of fuel elements in the hottest reactor zone, and coolant fluid conduits of fuel elements in the coolest reactor zone, said heat exchanger including a heating pipe having an inlet connected to said conduit means of said circuit between the conduits of fuel elements in the hottest reactor zone and the conduits of fuel elements in the coolest reactor zone for diverting fluid from said circuit as heating fluid into said heating pipe, said heating pipe having an outlet connected to the conduits of fuel elements in an intermediate temperature zone, said last mentioned conduits being connected to said circuit upstream of the connection of said heating pipe for returning the diverted fluid to said circuit, and an impact tube extending into the conduit means of said circuit between the conduits of fuel elements in the hottest reactor zone and the conduits of fuel elements in the coolest reactor zone for diverting fluid from said circuit as heating fluid into said heating pipe.

References Cited in the file of this patent
UNITED STATES PATENTS

| | | |
|---|---|---|
| 3,069,342 | Flatt | Dec. 18, 1962 |
| 3,085,964 | Ritz et al. | Apr. 16, 1963 |

FOREIGN PATENTS

| | | |
|---|---|---|
| 1,189,724 | France | Mar. 23, 1959 |

OTHER REFERENCES

Proceedings of the Second United Nations International Conf. on the Peaceful Uses of Atomic Energy, vol. 8, Geneva, 1958, pp. 398–414.